(12) United States Patent
Cardinaels

(10) Patent No.: US 6,624,357 B2
(45) Date of Patent: Sep. 23, 2003

(54) CABLE ADAPTER

(75) Inventor: Josef Cardinaels, Wetteren (BE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/021,353

(22) Filed: Dec. 19, 2001

(65) Prior Publication Data

US 2002/0070046 A1 Jun. 13, 2002

(30) Foreign Application Priority Data

Dec. 20, 2000 (EP) .............................. 00403614

(51) Int. Cl.⁷ .............................................. H02G 15/18
(52) U.S. Cl. ....................... 174/74 A; 174/93; 174/73.1
(58) Field of Search .............................. 174/74 R, 73.1, 174/74 A, 93

(56) References Cited

U.S. PATENT DOCUMENTS

| | | | |
|---|---|---|---|
| 4,159,860 A | * 7/1979 | Broad | 174/73.1 |
| 4,381,424 A | * 4/1983 | Hervig et al. | 174/73.1 |
| 4,742,184 A | * 5/1988 | Courty et al. | 174/73.1 |
| 5,352,731 A | * 10/1994 | Nakano et al. | 524/430 |
| 5,821,459 A | * 10/1998 | Cheenne-Astorino et al. | 174/73.1 |

OTHER PUBLICATIONS

Cheenne–Astorino A et al: "Cold Shrinkable Technology for Medium Voltage Cable Accesory", IEEE Transmission and Distribution Conference Proceedings, Sep. 15, 1996, pp. 386–390, US, New York, IEEE.

* cited by examiner

Primary Examiner—Chau N. Nguyen
(74) Attorney, Agent, or Firm—Sughrue Mion, PLLC

(57) ABSTRACT

A tubular cable adapter for use in jointing and/or terminating a medium voltage medium voltage paper insulated cable is provided. The cable adapter includes an impregnating compound barrier sleeve (1), a semi-conductive layer (2) partially covering the impregnating compound barrier sleeve, and a support member (3) for maintaining the impregnating compound barrier sleeve and the semi-conductive layer in a radial expanded state, the support member being removable from said impregnating compound barrier sleeve. The tubular cable adapter also has a conductive member (4) covering, at least partially, the impregnating compound barrier sleeve (1) and the semi-conductive conductive member layer (2).

14 Claims, 2 Drawing Sheets

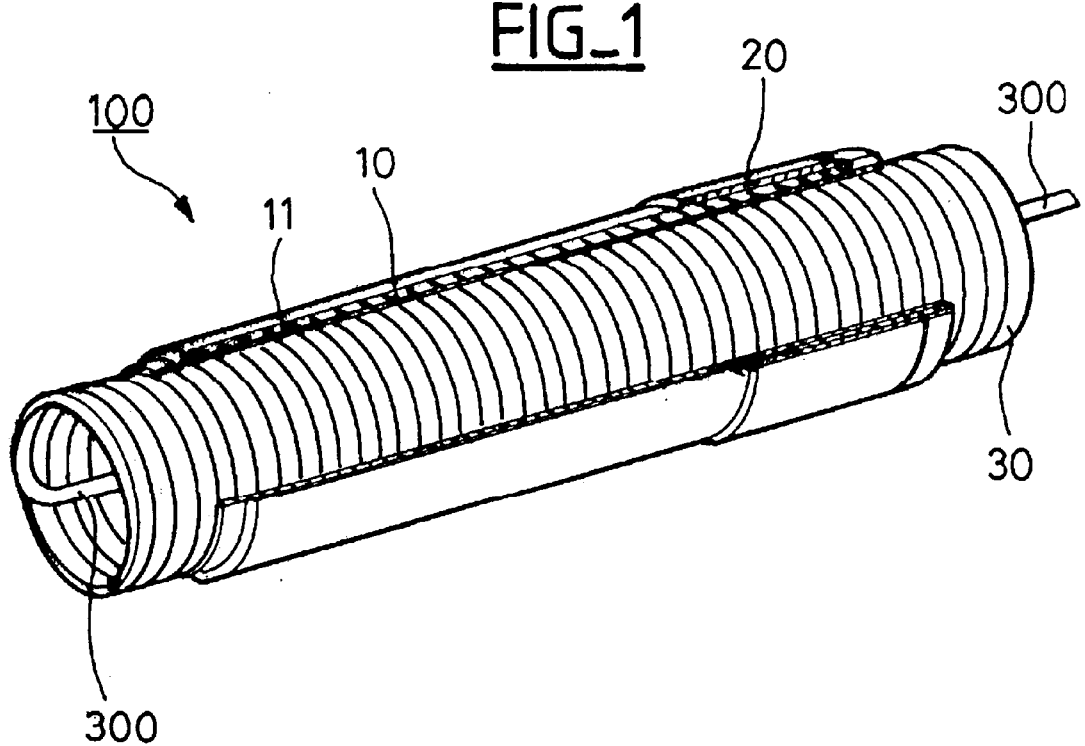
FIG_1
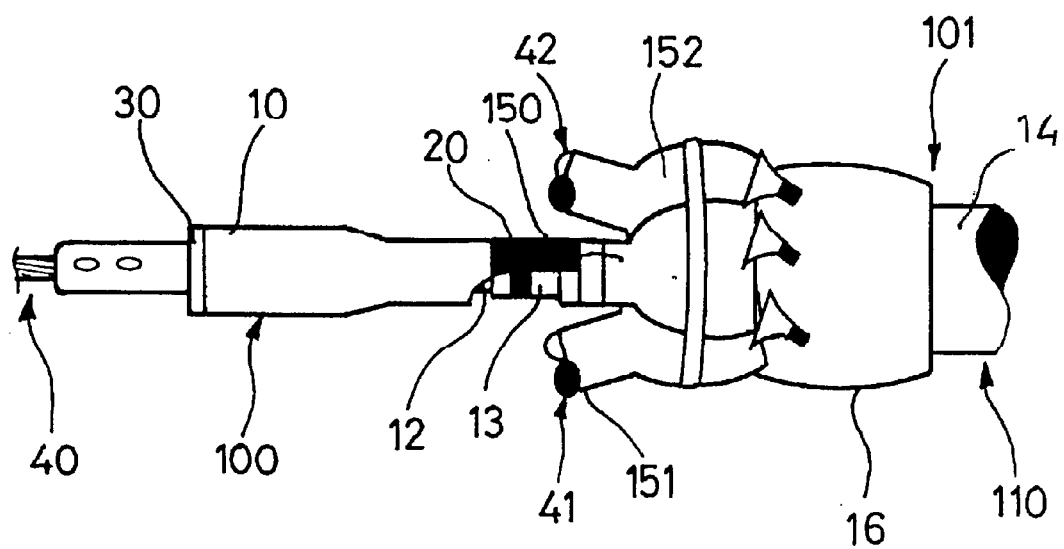
FIG_2

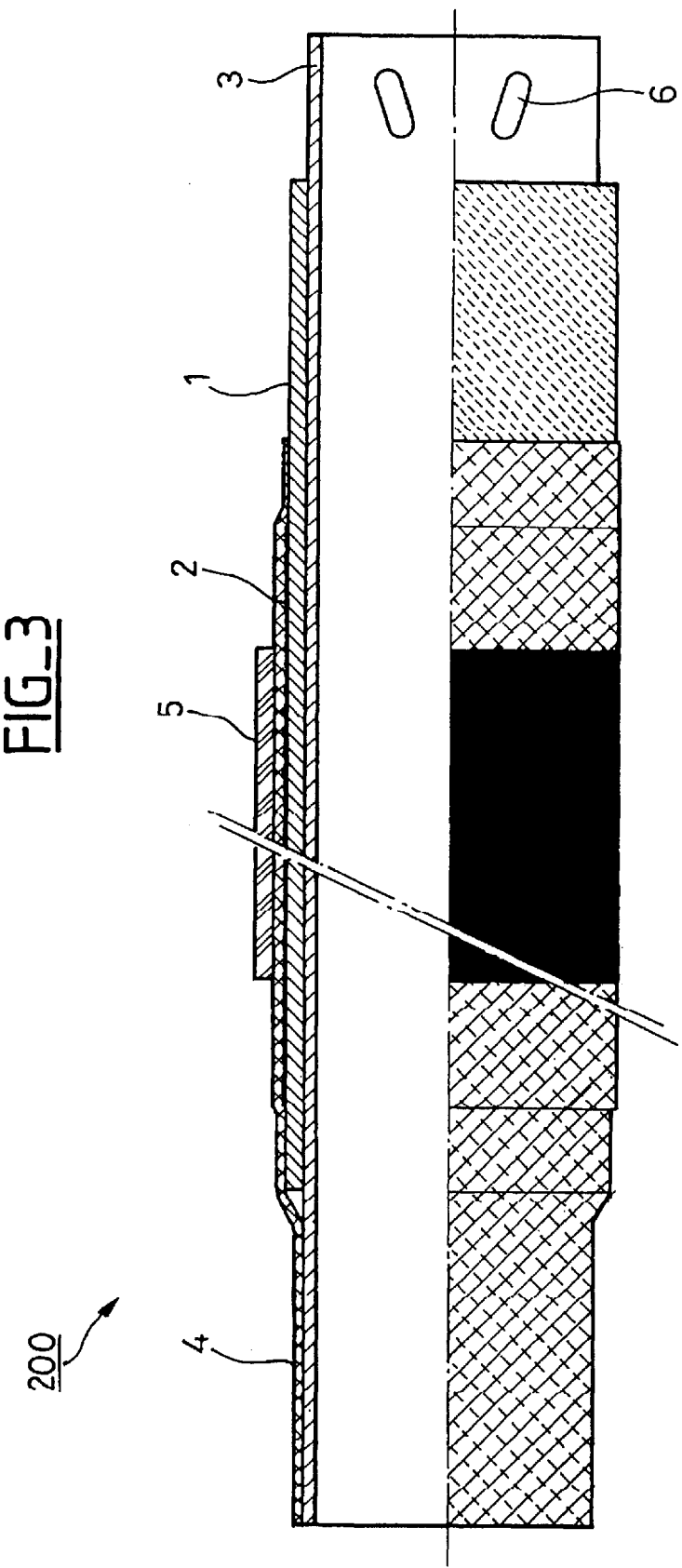

CABLE ADAPTER

BACKGROUND OF THE INVENTION

The present invention relates to a tubular cable adapter for use as transition in jointing and/or terminating medium voltage impregnated paper insulated cable, comprising an impregnating compound barrier sleeve, a semi-conductive layer partially covering said impregnating compound barrier sleeve, and a support member for maintaining said impregnating compound barrier sleeve and said semi-conductive layer in a radial expanded state, said support member being removable from said impregnating compound barrier sleeve.

When a medium voltage cable, and more particularly a impregnated paper insulated cable, e.g. a 3-phase paper insulated "Mineral Insulated Non Draining" type cable with common lead sheath, needs to be connected, terminated or jointed, by means of accessories normally used for polymeric insulated "dry" cables, it is current practice to apply a barrier layer over the impregnated paper insulating layers. This barrier layer seals the impregnating compound inside the paper layers, protects the paper-insulated cable and provides the same interface as for a dry cable on which the accessories can then be built.

In the present state of the art, a known solution is based on the use of a cold shrinkable tubular cable adapter as for instance disclosed by the European Patent Application EP-A1-0 780 949 entitled "Universal cable adapter, cable joint using the adapter and method of making same" of the "Minnesota Mining and Manufacturing Company" (3M™), first filed EP-95203627 on 23.12.1995.

FIG. 1 represents a longitudinal view of a tubular cable adapter 100 of this prior art. The cold shrinkable tubular cable adapter comprises:

an impregnating compound barrier tubular member 10, made from an elastic material and covering an insulating conformable material 11 such as a mastic, a semi-conductive layer 20, made from a semi conductive material such as a liquid silicone with conductive fillers added, covering partially and at one end the barrier member 10, and a support member 30 maintaining the barrier member 10 in a radial expanded state, the support member 30 being removable by pulling on the free end 300 of a helical strip.

Paper insulated cables for medium voltage applications of 10 kV to 30 kV most often are of 3-core design, i.e. 3 paper-insulated cores are housed inside a common metallic shield, e.g. a lead sheath. Each of these insulated cores can have an electrical screening layer, generally made of metalized paper (so called individually screened core) or not (belted core).

FIG. 2 shows a schematic example of the adapter 100 installed over one of the prepared belted cores 40, 41, 42 of a triphase paper cable 110. On the right side of figure 2, just beyond the break out 101, the cable 110 contains a common lead sheath 14 mainly covered by a trifurcating glove 16. Only the prepared core 40 is entirely represented on figure 2. The prepared core 40 consists of an impregnated paper insulation 12, partially covered by a metalized paper screening layer 13 previously applied in such core. The prepared core 40 is extending from the break-out 101 towards the adapter 100 to be installed. Before the installation of three adapters as adapters 100 over each core 40, 41, 42, it is necessary to install on each respective core 40, 41, 42 a metallic tubular braid 150, 151, 152, which needs to be supported by an individual support member (not shown). Furthermore, a short protective tube (not visible) supported by another additional support member (not shown) is installed over such braids 150, 151, 152. All support members are then removed and other steps, not detailed here, performed.

Each braid 150, 151, 152 is then folded back over the trifurcating glove 16 covering the protective tubes.

Thus, before adapters 100 can be installed on each core 40, 41, 42 different elements need to be installed, of which two are shrinkable and have their own support member.

SUMMARY OF THE INVENTION

The adapter 100 is installed so that the semi-conductive layer 20 is located above the screening layer 13 and its extremity is in contact with the tubular metallic braid 150.

Indeed, such adapters are used as a transition and provide a cable interface similar to the one of a dry cable. To complete the junction or the cable termination after the installation of adapter 100, a conventional joint device normally used between polymeric insulated "dry" cables covers such adapters.

This prior art solution is not satisfactory since there are various complex steps for achieving the required structure before completing the junction or the cable termination. This complexity and the high number of steps run the risk of causing mistakes and time loss.

An object of the present invention is to provide a tubular cable adapter modified to substantially reduce the cost and the installation time for a cable termination or a cable connection on an impregnated paper insulated cable.

To this end, the present invention provides a tubular cable adapter for use as transition in jointing and/or terminating a medium voltage impregnated paper insulated cable, comprising an impregnating compound barrier sleeve, a semi-conductive layer partially covering said impregnating compound barrier sleeve, and a support member for maintaining said impregnating compound barrier sleeve and said semi-conducive layer in a radial expanded state, said support member being removable from said impregnating compound barrier sleeve, characterized in that said tubular cable adapter further comprises a conductive member in contact with said semi-conductive layer and covering at least partially said impregnating compound barrier sleeve and said semi-conductive layer.

This single tubular cable adapter may be used to seal and shield the whole length of a prepared paper cable without metallic sheath and other outer sheaths in order to provide the same interface as for a dry cable A portion of the impregnating compound barrier sleeve not covered by the semi-conductive layer serves as the interface with the known accessories such as a classical joint.

The conductive member of the invention enables to make electric contacts and thus serves as fault current carrier and ensures the link between the different screens of the assembly. Moreover, it is a security element for protecting people during any accidental damaging of the core below it.

After the removal of the support member, the impregnating compound barrier sleeve extends from the break out of the paper cable to the conductor connection and is mainly located over the paper insulation layer of a paper cable. If present, a screening layer applied on the impregnated paper insulation is previously removed over a necessary distance in a conventional manner.

Unlike the prior art, no additional elements with their own support members need to be installed on the prepared cable before the adapter installation. The invention thus allows an easier and faster installation because of the less number of parts and less possibility of mistakes. It is also less expensive as the prior art solution.

Another characterizing embodiment of the present invention is that the conductive member can extend at one end beyond the impregnating barrier sleeve and can cover entirely the semi-conductive layer.

Thus, at such end, the conductive member can be brought into electrical contact with the lead sheath of the paper insulated cable.

Advantageously, the conductive member and the impregnating compound barrier sleeve can both be exposed, that is non recovered, at one same end of the support member.

In this way, at such end, the creation of an interface similar to that of a dry cable for a cable termination or a junction can be facilitated since the conductive member can be brought directly in electrical contact with a conductive member of an accessory and the impregnating compound barrier sleeve directly protects such accessory against the impregnating compound of the cable.

In a preferred embodiment of the invention, the conductive member is partially free to move and preferably is partially foldable.

Therefore, during installation, the first end of the conductive member can be folded back before the sliding of the support member over a paper insulated cable core positioning the end of the barrier sleeve as close as possible to the break out of the paper cable. The support member is then pulled from under the barrier sleeve. The first end of the conductive member is then folded over the lead sheath of the cable in order to be brought into electrical contact therewith, thus allowing the continuity of the shielding of the cable.

Moreover, the second end of the conductive member can also be movable so that the ends of the semi-conductive layer can become exposed over a certain length. Preferably, the ends of the impregnating compound barrier sleeve are not covered by the semi-conductive layer.

Thus, at the end near the break out of the cable, the semi-conductive layer stops before the end of the barrier sleeve. In the case of belted cores of a 3-core cable, it provides an improved electrical functioning since the distance between the ground and the voltage provided by such core is raised. At the other end, a certain length of barrier sleeve is necessary as it serves as interface with the accessory further installed.

Preferably, the tubular cable adapter of the invention can further comprise an outer protective sleeve partially covering the conductive member.

The outer protective sleeve is used to electrically insulate a part of the assembly and particularly the adjacent conductive member and also to protect the paper cable from water particularly in the given length between the joint and a trifurcating glove located near the break out.

In this way, an adapter with all the essential elements together on a single support member is provided.

Preferably, the protective sleeve can be in a radial expanded state.

In this way, the adapter is a shrinkable adapter and preferably a cold shrinkable adapter.

Advantageously, the conductive member can be exposed at each end of the outer protective sleeve.

In this way, when shrunk onto the cable after having removed the support element, the conductive member is long enough to be brought into electrical contact with a lead sheath of the paper cable before the break out at one end and with the metallic shielding device of an accessory on the other end. The conductive member thus insures the shielding continuity of the cable. By way of example, at this other end, the conductive member can be brought into electrical contact with a copper stocking of a classical joint.

Preferably, the outer protective sleeve of the invention can be adapted for covering a part of the length of the conductive member located over the semi-conductive layer.

Yet another characterizing embodiment of the present invention is that the support member is a support tube whereon said impregnating compound barrier sleeve is adapted to slide.

The support member disclosed in the above-mentioned European Patent Application is made of a plastic wired spiral. The impregnating compound barrier sleeve is shrunk onto the cable by unwinding and pulling one end of the spiral, from the opposite end of the support member. Because of the shrinking impregnating compound barrier sleeve, the wire of the spiral is pressed against the cable over all the length of the tubular cable adapter. This contact between the moving plastic wire and the cable may damage the paper layers. Using a tube that slides from under the impregnating compound barrier sleeve largely reduces the risk of damaging. Such a tube is for instance described in the document EP-0 631 357 and will therefore not be detailed further here.

In one preferred embodiment of the invention, the conductive member is a copper stocking, the impregnating compound barrier sleeve is a silicone rubber sleeve, the semi-conductive layer is made of semi-conductive silicone rubber, and the impregnating compound barrier sleeve with the semi-conductive layer together form a cold shrinkable adapter sleeve expanded on the support member.

Preferably, the impregnating compound barrier sleeve can have a length preferably greater than 400 mm, the semi-conductive layer can have a length preferably greater than 300 mm, and the conductive member can have a length preferably greater than 400 mm.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

BRIEF DESCRIPTION OF THE DRAWINGS

The above and other objects and features of the invention will become more apparent and the invention itself will be best understood by referring to the following description of an embodiment taken in conjunction with the accompanying drawings. In the figures:

FIG. 1 shows a longitudinal view of a tubular cable adapter of the prior art previously described, FIG. 2 shows a schematic example of the adapter of FIG. 1 installed on a cable, FIG. 3 represents a longitudinal view of the tubular cable adapter 200 according to the invention, with the upper part partially removed to show the different layers constituting the adapter. The middle part of the adapter is cut away in this FIG. 3 because only the ends thereof are important to explain the invention.

DETAILED DESCRIPTION OF THE INVENTION

A cable adapter is used to transform the end of each core of such cable into a so-called "dry" cable end or interface.

The present cable adapter 200 provides, on each cable-core end, an impregnating compound barrier sleeve 1. The impregnating compound barrier sleeve 1 is preferably made of silicone rubber, covered by a semi-conductive layer 2 over part of its length, itself covered by a conductive member 4 free to move and foldable at its free ends. The whole being, at least partially, covered by an outer protective sleeve 5 made of silicone, EPDM or of any other suitable rubber material.

According to the invention, with aim of building a termination or a junction on, for instance, a 3-phase cable, starting from a break out of such a paper insulated cable, a distinct barrier sleeve 1 is directly placed on each core. It is to be noted that, if each core is provided with an individual screening layer, this has to be removed first over a certain distance. The semi-conductive layer 2 over each barrier sleeve 1 keeps the electrical field inside the cable. Over each semi-conductive layer 2, the conductive member in the form of a metallic stocking 4 serves as fault current carrier, protection, and connection between the different screen elements. Finally, the outer protective sleeve 5 over the stocking 4 seals and insulates the assembly. For each core, all these operations are performed in a single step owing to the cold-shrinkable tubular cable adapter such as the one shown on the FIG. 3.

Preferably, the impregnating compound barrier sleeve 1 has a length greater than 400 mm. The semi-conductive layer 2 has a length greater than 300 mm and the conductive member has a length greater than 400 mm.

In the following description, the left end of the adapter 200 shown in FIG. 3 is close to the beginning of the break out of the paper cable (not shown). The right end of the adapter 200 is close to a dry cable interface on which standard accessories can be installed.

During installation, the left free end of the stocking 4 is folded back over the outer protective sleeve 5, the support member 3 is then slid over the paper insulated cable core so that the left end of the impregnating compound barrier sleeve 1 is positioned as close as possible to the break out of the cable (not shown). The support member or tube 3 is then pulled to the right from under the silicone rubber sleeve 1 by means of a hook fitting in the holes 6 provided at the right end of the tube 3. By removing the tube 3, the whole assembly, i.e. the cold-shrinkable adapter sleeve and the protective sleeve 5, is allowed to shrink onto the cable core transforming thereby the paper insulated cable core into a polymeric insulated cable, i.e. a dry cable.

The left end of the stocking 4 is now folded over the lead sheath of the cable in order to be brought into electrical contact therewith, thus allowing the continuity of the shielding of the cable.

When adapter sleeves are installed on the three cores of the 3-core cable, and the stockings are interconnected to the metallic sheath of the cable, a common screen tape (in the case of belted cores) and then a sealing trifurcating glove (not shown) are installed over the break out area. More precisely, at one end, the three fingers of this glove partially cover the left end of each outer protective sleeve 5 and at the other end, the glove overlays the end of the metallic sheath.

At the right end of the adapter installed on each cable core, the free end of the metal stocking 4 is now folded back over the right end of the outer protective sleeve 5. Hereby the end of the semi-conductive layer 2 becomes exposed over a certain length.

In this way, an oil filled paper insulated 3-phase cable has turned, in a few simple steps, into an individually phase-shielded polymeric insulated cable on which standard accessories can be installed.

Each cable adapter of the invention can be manufactured in the following way.

An impregnating compound barrier sleeve 1 of extruded silicone rubber is covered by a layer of semi-conductive silicone rubber 2, applied over a part of its length and chemically bonded thereto. Together, they form a cold shrinkable adapter sleeve that will be expanded and installed on a support member 3.

In this state, a part of the adapter sleeve is covered by a conductive member that is generally a copper stocking 4, also called "stockingette", and which extends beyond the adapter sleeve, at the left end on the figure.

The stocking 4 is in turn covered by an outer protective rubber sleeve 5 in a radial expanded state. At both ends of the sleeve 5, parts of the stocking 4 remain uncovered to be able to make electrical contacts.

While the principles of the invention have been described above in connection with specific apparatus, it is to be clearly understood that this description is made only by way of example and not as a limitation on the scope of the invention, as defined in the appended claims.

What is claimed is:

1. A tubular cable adapter for use as transition in jointing or terminating medium voltage paper insulated cable, comprising:
    an impregnating compound barrier sleeve (1);
    a semi-conductive layer (2) partially covering said impregnating compound barrier sleeve, so that a portion of said impregnating compound barrier sleeve is not covered by said semi-conductive layer;
    a support member (3) for maintaining said impregnating compound barrier sleeve and said semi-conductive layer in a radial expanded state, said support member being removable from said impregnating compound barrier sleeve; and
    a conductive member (4) at least partially covering said impregnating compound barrier sleeve (1) and said semi-conductive conductive member layer (2).

2. The cable adapter according to claim 1, wherein said conductive member (4) extends at one end beyond said impregnating compound barrier sleeve (1) and said conductive member covers entirely said semi-conductive layer (2).

3. The cable adapter according to claim 1, wherein said conductive member is partially free to move.

4. The cable adapter according to claim 1, wherein said conductive member is partially foldable.

5. The cable adapter according to claim 1, wherein said tubular cable adapter further comprises an outer protective sleeve (5) partially covering said conductive member (4).

6. The cable adapter according to claim 5, wherein said protective sleeve (5) is in a radial expanded state.

7. The cable adapter according to claim 5, wherein said conductive member (4) is exposed at each end of said outer protective sleeve (5).

8. The cable adapter according to claim 5, wherein said outer protective sleeve (5) is adapted for covering a part of the length of said conductive member (4) located over said semi-conductive layer (2).

9. The cable adapter according to claim 1, wherein said support member (3) is a support tube whereon said impregnating compound barrier sleeve (1) is adapted to slide.

10. The cable adapter according to claim 1, wherein said conductive member (4) is a copper stocking.

11. The cable adapter according to claim 1, wherein said impregnating compound barrier sleeve (1) is a silicone rubber sleeve, said semi-conductive layer (2) is made of semi-conductive silicone rubber, and said impregnating compound barrier sleeve with said semi-conductive layer together form a cold shrinkable adapter sleeve expanded on said support member (3).

12. A cable adapter for use as transition in jointing or terminating medium voltage paper insulated cable, comprising:

an impregnating compound barrier sleeve (1);

a semi-conductive layer (2) partially covering said impregnating compound barrier sleeve;

a support member (3) for maintaining said impregnating compound barrier sleeve and said semi-conductive layer in a radial expanded state, said support member being removable from said impregnating compound barrier sleeve; and a conductive member (4) at least partially covering said impregnating compound barrier sleeve (1) and said semi-conductive conductive member layer (2), wherein said conductive member (4) and said impregnating compound barrier sleeve (1) are both exposed at one same end of said support member (3).

13. A cable adapter for use as transition in jointing or terminating medium voltage paper insulated cable, comprising:

an impregnating compound barrier sleeve (1);

a semi-conductive layer (2) partially covering said impregnating compound barrier sleeve;

a support member (3) for maintaining said impregnating compound barrier sleeve and said semi-conductive layer in a radial expanded state, said support member being removable from said impregnating compound barrier sleeve; and a conductive member (4) at least partially covering said impregnating compound barrier sleeve (1) and said semi-conductive conductive member layer (2), wherein the ends of said impregnating compound barrier sleeve (1) are not covered by said semi-conductive layer (2).

14. A cable adapter for use as transition in jointing or terminating medium voltage paper insulated cable, comprising:

an impregnating compound barrier sleeve (1);

a semi-conductive layer (2) partially covering said impregnating compound barrier sleeve;

a support member (3) for maintaining said impregnating compound barrier sleeve and said semi-conductive layer in a radial expanded state, said support member being removable from said impregnating compound barrier sleeve; and a conductive member (4) at least partially covering said impregnating compound barrier sleeve (1) and said semi-conductive conductive member layer (2), wherein said impregnating compound barrier sleeve (1) has a length preferably greater than 400 mm, said semi-conductive layer (2) has a length preferably greater than 300 mm, and said conductive member (4) has a length preferably greater than 400 mm.

* * * * *